United States Patent
Manaugh et al.

(10) Patent No.: US 7,786,611 B1
(45) Date of Patent: Aug. 31, 2010

(54) SYSTEM AND METHOD FOR GENERATING WIND POWER FROM A VERTICAL STRUCTURE

(76) Inventors: Thomas Manaugh, 9747 Amberley Dr., Dallas, TX (US) 75243; David Leon, 411 Kirkmeadow La., Dallas, TX (US) 75287

( * ) Notice: Subject to any disclaimer, the term of this patent is extended or adjusted under 35 U.S.C. 154(b) by 0 days.

(21) Appl. No.: 12/483,707

(22) Filed: Jun. 12, 2009

Related U.S. Application Data

(60) Provisional application No. 61/060,809, filed on Jun. 12, 2008.

(51) Int. Cl.
*F03D 9/00* (2006.01)
(52) U.S. Cl. .............. 290/55; 290/44; 415/4.2
(58) Field of Classification Search .......... 290/43, 290/44, 54, 55; 415/4.2, 4.3
See application file for complete search history.

(56) References Cited

U.S. PATENT DOCUMENTS

| | | | |
|---|---|---|---|
| 4,047,833 A | | 9/1977 | Decker |
| 4,116,581 A | * | 9/1978 | Bolie ................... 415/4.4 |
| 4,516,907 A | * | 5/1985 | Edwards ............... 415/4.5 |
| 6,464,459 B2 | * | 10/2002 | Illingworth ........... 415/208.2 |
| 7,098,552 B2 | * | 8/2006 | McCoin ................ 290/44 |
| 7,488,150 B2 | * | 2/2009 | Krippene ............... 415/4.2 |
| 2009/0167025 A1 | * | 7/2009 | Graham, Sr. .......... 290/55 |

* cited by examiner

*Primary Examiner*—Nicholas Ponomarenko
(74) *Attorney, Agent, or Firm*—Michael Diaz

(57) ABSTRACT

A ducting structure for generating wind power from a vertical structure. The ducting structure includes a main housing sized and shaped to be coupled to a wind turbine and located on the vertical structure. The main housing includes a vertically oriented aperture having a first duct leading to the coupled wind turbine and a horizontally oriented aperture having a second duct leading to the coupled wind turbine. The vertically oriented aperture captures a prevailing wind and the horizontally oriented aperture captures an updraft flowing upwardly along the vertical structure. The captured updraft and the prevailing wind are guided through the first and second ducts past the coupled wind turbine.

19 Claims, 6 Drawing Sheets

SYSTEM AND METHOD FOR GENERATING WIND POWER FROM A VERTICAL STRUCTURE

RELATED APPLICATIONS

This utility application claims the benefit of U.S. Provisional Patent Application Ser. No. 61/060,809 filed Jun. 12, 2008 by Thomas Manaugh and David Leon, which is hereby incorporated by reference.

BACKGROUND OF THE INVENTION

1. Field of the Invention

This invention relates to energy generation devices. Specifically, and not by way of limitation, the present invention relates to a system and method for generating wind power from a vertical structure.

2. Description of the Related Art

With the current energy crisis, it is imperative that alternate sources of energy be developed for the generation of electric power. Windmills have provided a valuable source of alternative energy. There have been many improvements and various configurations of windmills utilized over the years. Generally, there are two basic types of windmills. In a first type, a horizontal windmill has a horizontal rotation axis which rotates on the top of a supporting post. The front edge of the rotation axis typically includes a plurality of blades having a propeller shape. The second type of windmill is a vertical windmill which has a vertical rotation axis provided with a plurality of longitudinal blades having a radial shape. However, for both types of windmills must be positioned out in open spaces or upon towers above the ground.

For windmills located in open spaces, the windmills must be located away from populated areas. Transmission of generated energy can be extremely costly making the use of these windmills inefficient and cost-ineffective. For windmills located on towers, the towers are constructed solely for use by the windmills. The construction costs for constructing these towers adds to the overall cost in implementing such windmills.

In addition, it is beneficial to locate turbines in areas where wind speed is consistently high because the amount of electrical energy that can be generated increases as the square of wind speed. It has been observed that wind speeds tends to be high on rooftops because of the effect of combining the prevailing wind across the rooftop with the updraft that moves around and over a building. FIG. 1 is a schematic illustrating a combining effect of a prevailing wind 111 upon a vertical structure. The prevailing wind 111 combines with a updraft (or updraft) 122 at a roofline 133 of a building 144 to produce a combined wind 155 that has a speed greater than either the prevailing wind or the updraft.

Thus, it would be advantageous to have an apparatus which utilizes the combined wind to efficiently produce electricity. It is an object of the present invention to provide such an apparatus and method.

SUMMARY OF THE INVENTION

To benefit from the combined wind in producing electricity, the present invention utilizes a unique ducting structure to funnel both updraft and prevailing wind at a roofline toward a wind turbine. The present invention utilizes adjoining surfaces in the apparatus that are curved and molded to allow wind to be funneled without loss of speed from unnecessary air turbulence.

In one aspect, the present invention is directed to a ducting structure for generating wind power from a vertical structure, such as a building. The ducting structure includes a main housing sized and shaped to be coupled to a wind turbine and located on the vertical structure. The main housing includes a vertically oriented aperture having a first duct leading to the coupled wind turbine and a horizontally oriented aperture having a second duct leading to the coupled wind turbine. The vertically oriented aperture captures a prevailing wind and the horizontally oriented aperture captures an updraft flowing upwardly along the vertical structure. The captured updraft and the prevailing wind are guided through the first and second ducts past the coupled wind turbine.

In another aspect, the present invention is directed to a wind power generation apparatus for generating wind power from a vertical structure. The apparatus includes a wind turbine and a main housing sized and shaped to be coupled to the wind turbine and located on the vertical structure. The main housing includes a vertically oriented aperture having a first duct leading to the coupled wind turbine and a horizontally oriented aperture having a second duct leading to the coupled wind turbine. The vertically oriented aperture captures a prevailing wind and the horizontally oriented aperture captures an updraft flowing upwardly along the vertical structure. The captured updraft and the prevailing wind are guided through the first and second ducts past the coupled wind turbine for generating wind power.

In still another aspect, the present invention is directed to a method of generating wind power from a vertical structure. The method begins by affixing a ducting structure on an edge of the vertical structure. A wind turbine is then coupled to the ducting structure. In addition, a power generation system is coupled to the wind turbine. A portion of a prevailing wind is then captured and guided by a vertically oriented aperture through a first duct toward the wind turbine. Additionally, a portion of an updraft traveling upward along the vertical structure is captured and guided by a horizontally oriented aperture through a second duct toward the wind turbine. The captured prevailing wind and updraft is then directed past the wind turbine, thereby rotating the wind turbine. The power generation system then converts the rotational energy of the rotating wind turbine into electric power.

In another aspect, the present invention is a wind power generation system for generating wind power from a vertical structure. The system includes a plurality of wind generation devices aligned adjacent each other along a top edge of the vertical structure. Each wind generation device includes a wind turbine and a main housing sized and shaped to be coupled to the wind turbine and located on the vertical structure. The main housing includes a vertically oriented aperture having a first duct leading to the coupled wind turbine a horizontally oriented aperture having a second duct leading to the coupled wind turbine. The vertically oriented aperture captures a prevailing wind and the horizontally oriented aperture captures an updraft flowing upwardly along the vertical structure. The captured updraft and the prevailing wind are guided through the first and second ducts past the coupled wind turbine for generating wind power.

DESCRIPTION OF THE INVENTION

Figure 5:
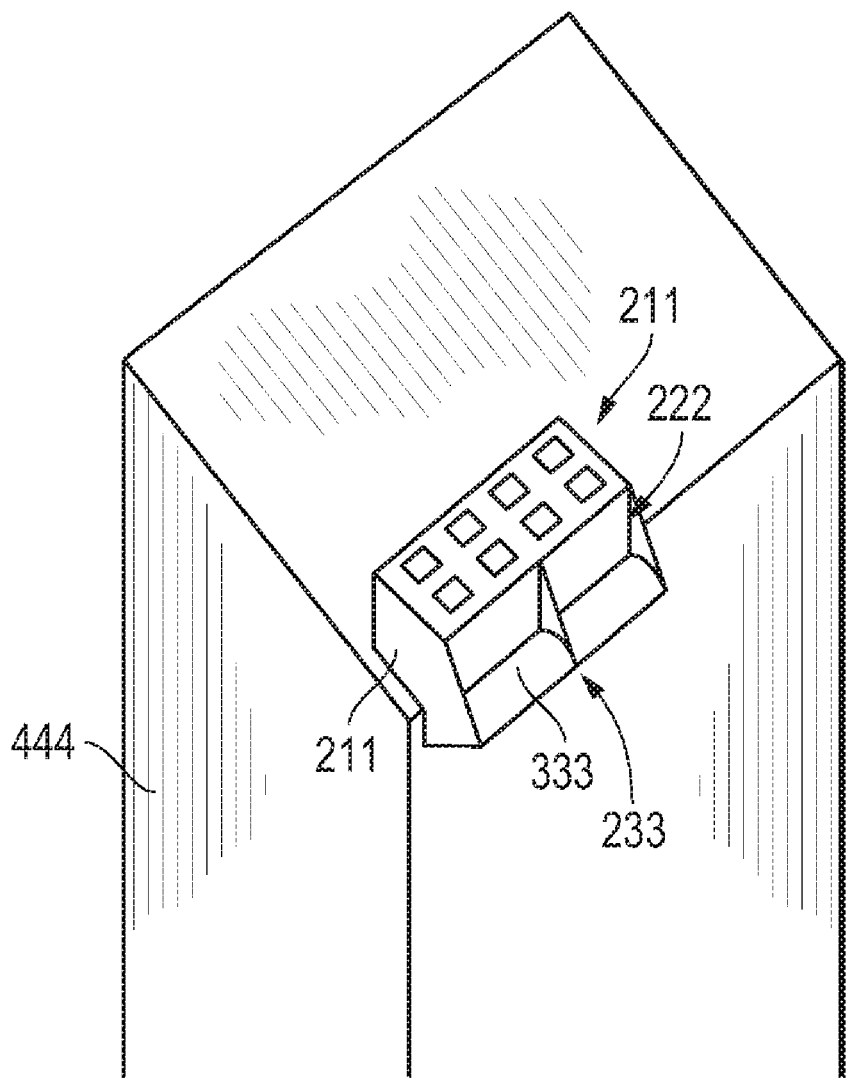
FIG. 5 is a perspective view of a ducting structure and wind turbine affixed to a top of a building in the preferred embodiment of the present invention.

The present invention is a system and method for generating wind power from a vertical structure. FIG. 5 is a perspective view of a ducting structure 211 and wind turbine 288 affixed to a top of a building in the preferred embodiment of the present invention.

Figure 1:
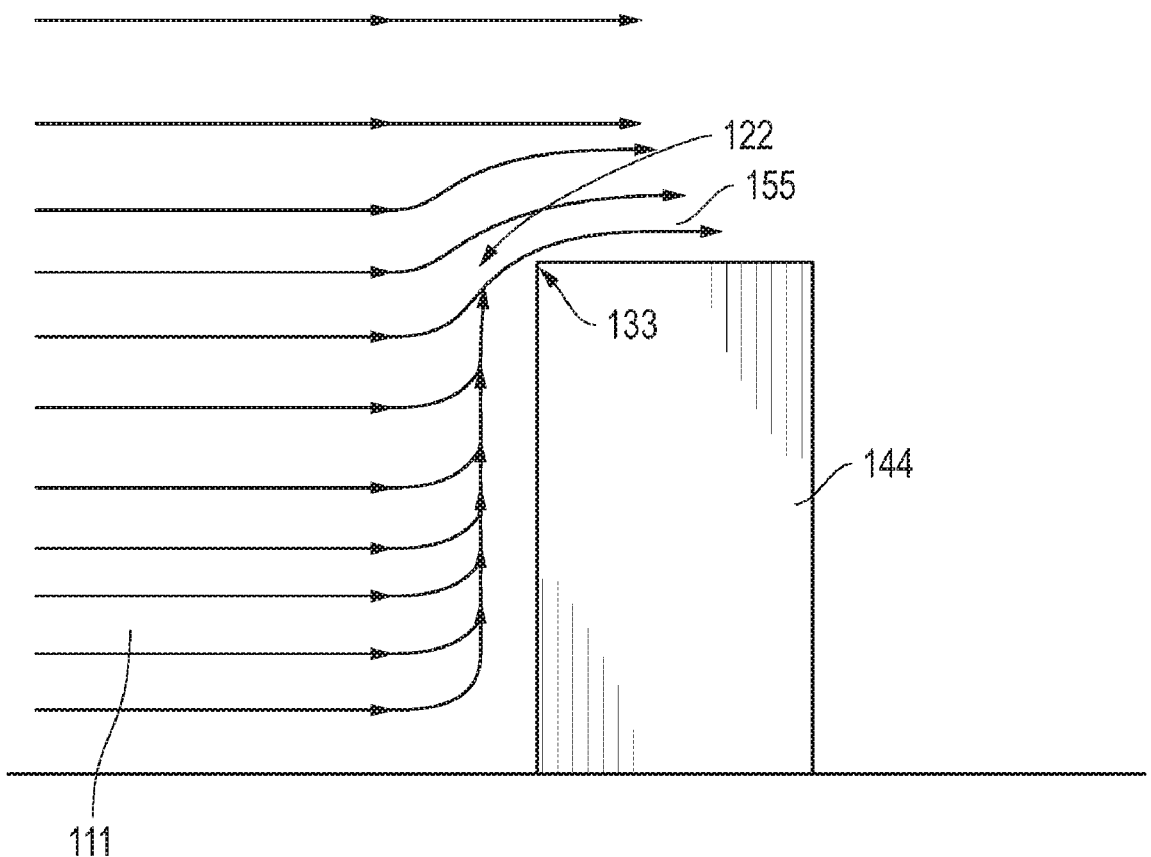
FIG. 1 (prior art) is a schematic illustrating a combining effect of a prevailing wind upon a vertical structure.
Figure 2:
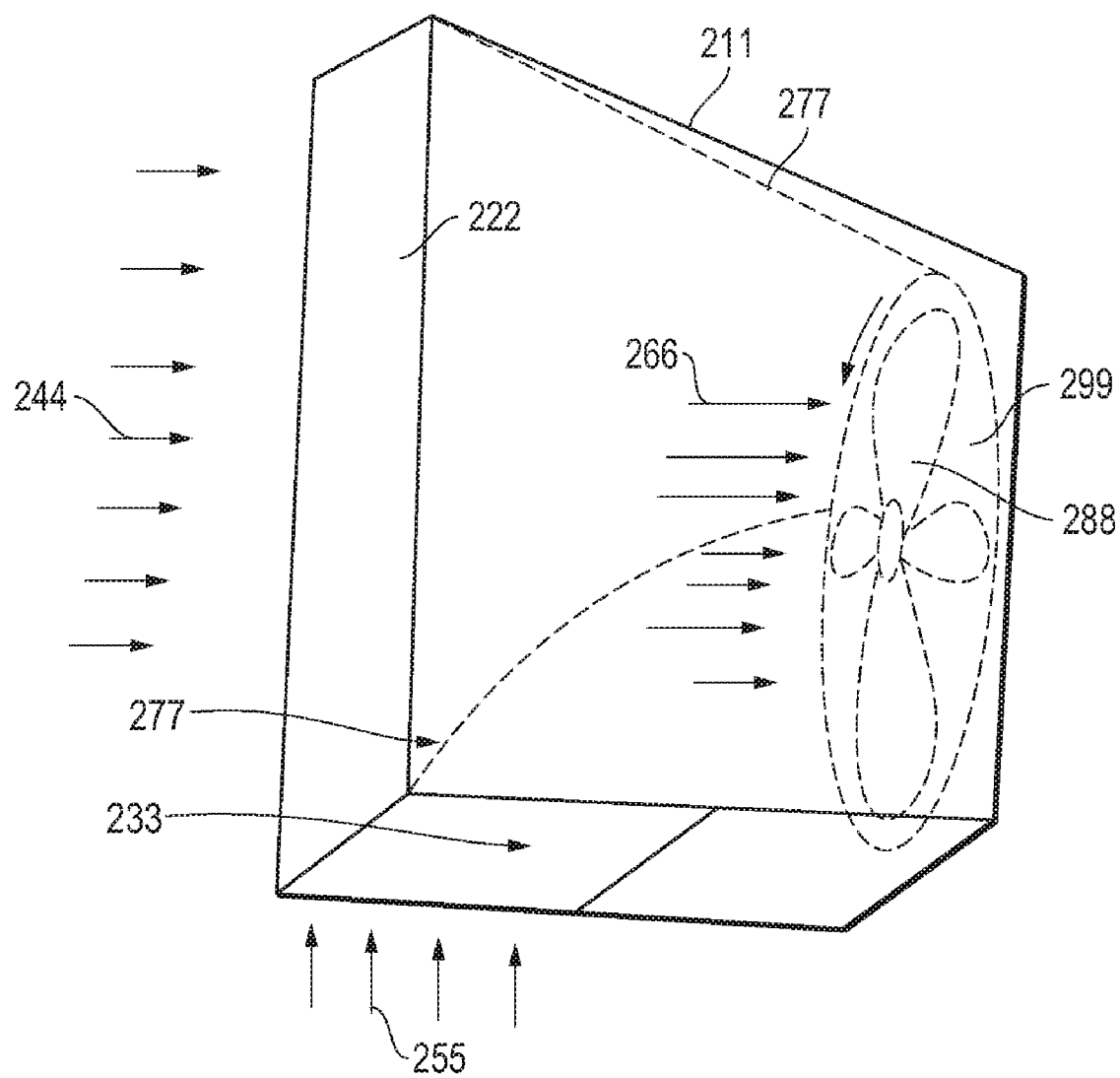
FIG. 2 is a side view of the ducting structure in the preferred embodiment of the present invention.

FIG. 2 is a side view of the ducting structure 211 in the preferred embodiment of the present invention. The ducting structure 211 includes main housing having a vertically oriented aperture 222 and a horizontally oriented aperture 233. The vertically oriented aperture 222 is substantially vertical in orientation and receives a substantially horizontally flowing prevailing wind 244. The horizontally oriented aperture 233 receives the substantially vertically flowing updraft 255. The updraft 255 is generated as the wind approaches a building and rises to the roofline (as depicted in FIG. 1). The combination of the captured prevailing wind 244 and the updraft 255 creates a combined wind 266 which flows through funneling structures (ducts) 277 (depicted as dashed lines) toward a wind turbine 288 and out through an exhaust aperture 299 located at a rear portion of the ducting structure 211.

The ducting structure may be constructed of a rigid material, such as steel, composite materials, etc. In addition, it should be understood by those skilled in the art, that the ducting configuration may be shaped differently than depicted in FIG. 2, while still capturing the updraft 255 and prevailing wind 244 to create the combined wind 266 for use in the wind turbine 288.

Figure 3:
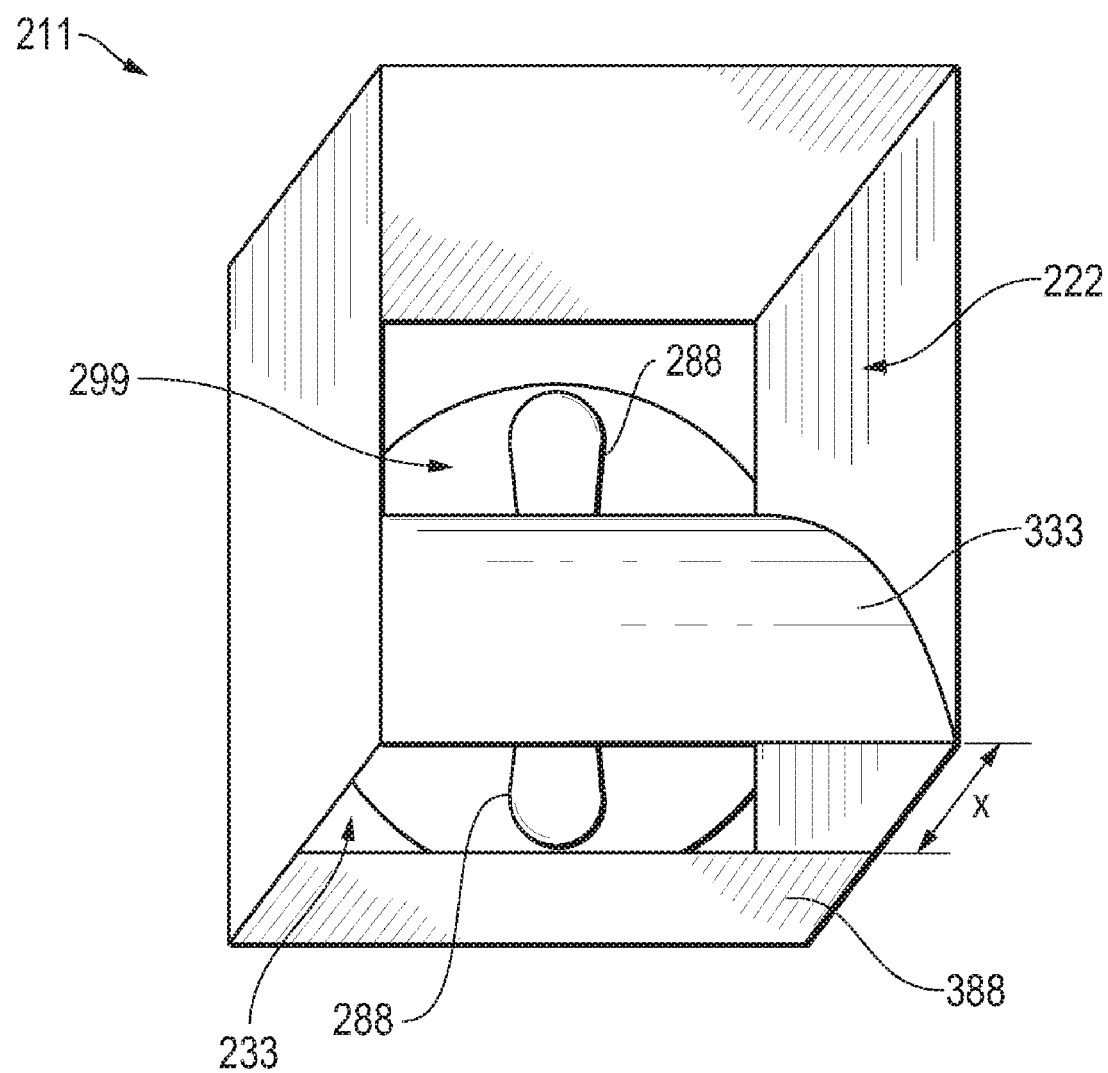
FIG. 3 is a front perspective view of the ducting structure of FIG. 2.

FIG. 3 is a front perspective view of the ducting structure 211 of FIG. 2. Both the vertically oriented aperture 222 (which receives the prevailing wind 244) and the horizontally oriented aperture 233 (which receives the updraft 255) allow an interior view of the ducting structure 211. A curved separation wall 333 serves as the floor for the vertically oriented aperture 222 and the roof of the horizontally oriented aperture 233. The vertically oriented aperture 222 provides a first duct which is separate from a second duct of the horizontally oriented aperture 233. In the preferred embodiment of the present invention, the two ducts eventually meet adjacent to the wind turbine 288, where the separation wall ends. The funneling structures 277 are preferably curved to allow the flow of the wind without minimal disruption of the air flow. FIG. 3 also illustrates the exhaust aperture 299 and the wind turbine 288. In addition, the ducting structure includes a base panel 388. When the ducting structure 211 is affixed to a building, the base portion is affixed at the roofline and preferably does not extend beyond the roofline of a building (see FIG. 5). However, the horizontally oriented aperture 233 preferably extends outward from the building a distance of X (equivalent to the depth of the horizontally oriented aperture 233) to capture the updraft 255 as it travels upwardly upon the face of the building.

Figure 4:
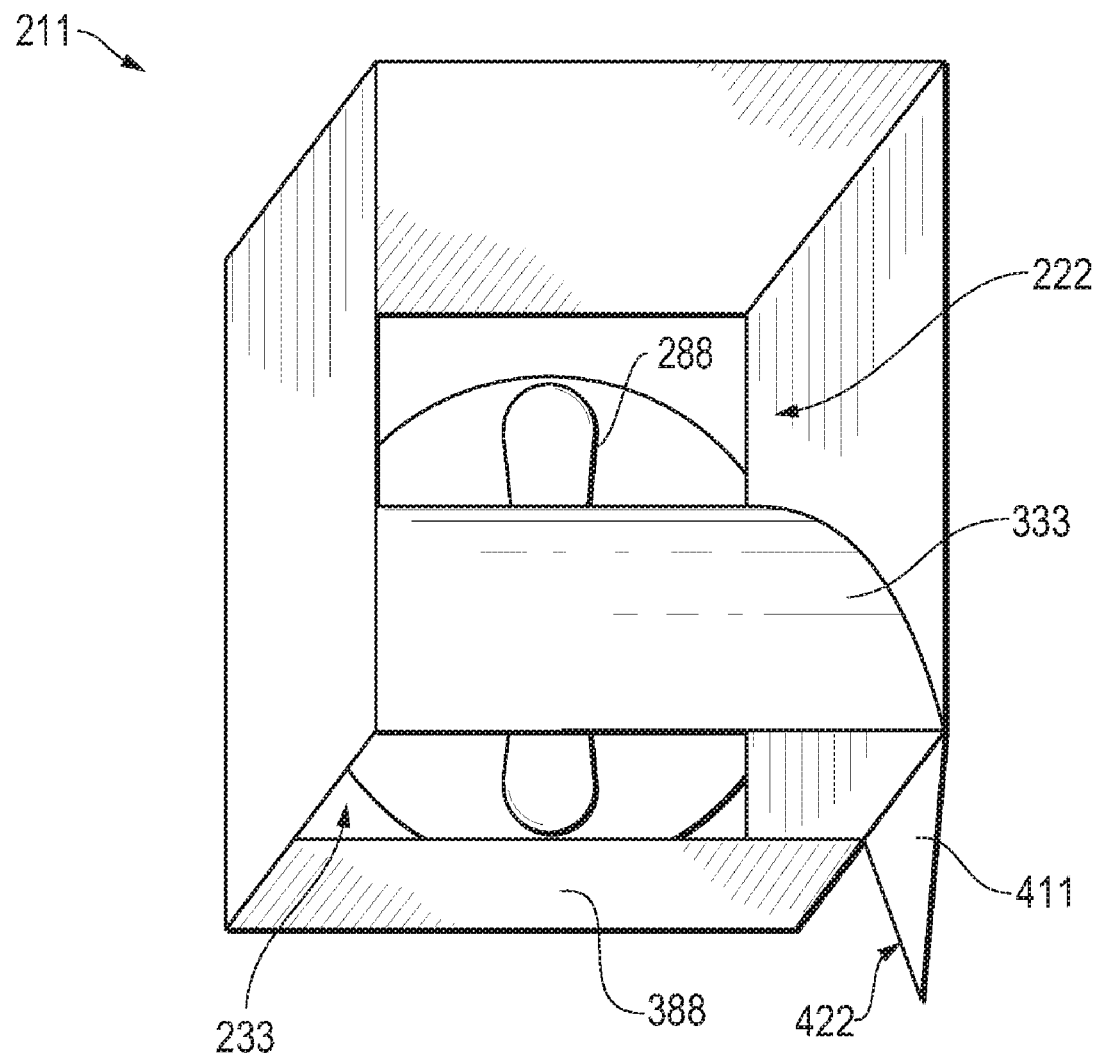
FIG. 4 is a front perspective view of the ducting structure in an alternate embodiment of the present invention.

FIG. 4 is a front perspective view of the ducting structure 211 in an alternate embodiment of the present invention. The ducting structure 211 is the same as depicted in FIG. 3 with an additional side panel 411. The side panel 411 forms an "ear flap" which extends downwardly from a plane of the rooftop of the building (not shown in FIG. 4) upon which the ducting structure 211 is positioned against. The base panel 388 and horizontally oriented aperture 233 are both on the rooftop plane. In this embodiment, the side panel 411 is sized and shaped to lie flush with the exterior of the building at a side panel edge 422, thereby allowing the side panel 411 to create a dam against upward flowing updraft flowing away from the side instead of into the horizontally oriented aperture 233. Preferably, a plurality of ducting structures 211 are aligned adjacent and flush to each other along the roofline. The ducting structure 211 with the side panel 411 would be located on each end of the row of ducting structures 211 with the outer ducting structures having the side panels on the outermost sides of the plurality of ducting structures.

With reference to FIGS. 2-4, the operation of the present invention will now be explained. The ducting structure is positioned on an edge of the building at the roofline. Preferably, the base panel 388 is affixed at the roofline and does not extend beyond the roofline of the building. However, the horizontally oriented aperture 233 preferably extends outward from the building at a distance of X to capture the updraft 255 as it travels upwardly upon the face of the building. The ducting structure may be affixed to the building in any fashion which securely attaches the ducting structure to the building and prevents inadvertent detachment from the building, especially in strong wind conditions. The present invention may use anchors, cables or other devices which attach to the ducting structure and the building to provide a stable platform. The wind turbine 288 is mechanically coupled to the ducting structure 211. A power generation system for transferring the kinetic energy of the moving wind turbine is coupled to the wind turbine (not shown). The power generation system for use with the wind turbine 288 is well known to those skilled in the art and is not discussed herein. However, the power generation system, due to its proximity to the building, may provide power directly to the building or nearby locations, thereby reducing transmission losses. The prevailing wind 244 flows and hits the building at different altitudes. The prevailing wind 244, at higher altitudes (such as at the roofline of the building), typically has a higher velocity. The vertically oriented aperture 222 captures the prevailing wind and directs the captured prevailing wind toward the wind turbine 288. Additionally, the prevailing wind 244 hits the building and flows upwardly, to create an updraft 255. The horizontally oriented aperture 233 captures this updraft and directs the updraft towards the wind turbine 288. The combined updraft 255 and prevailing wind 244 creates the combined wind 266, which is directed toward the wind turbine 288. As the combined wind 266 flows by the wind turbine 288 and out through the exhaust aperture 299, the wind turbine rotates. As the wind turbine 288 rotates, the kinetic energy created from the rotation of the wind turbine generates power as is well known in existing wind generation systems. A plurality of ducting structures 211 may be aligned adjacent each other. On each end of the aligned ducting structures, the side panels may be utilized.

Figure 6:
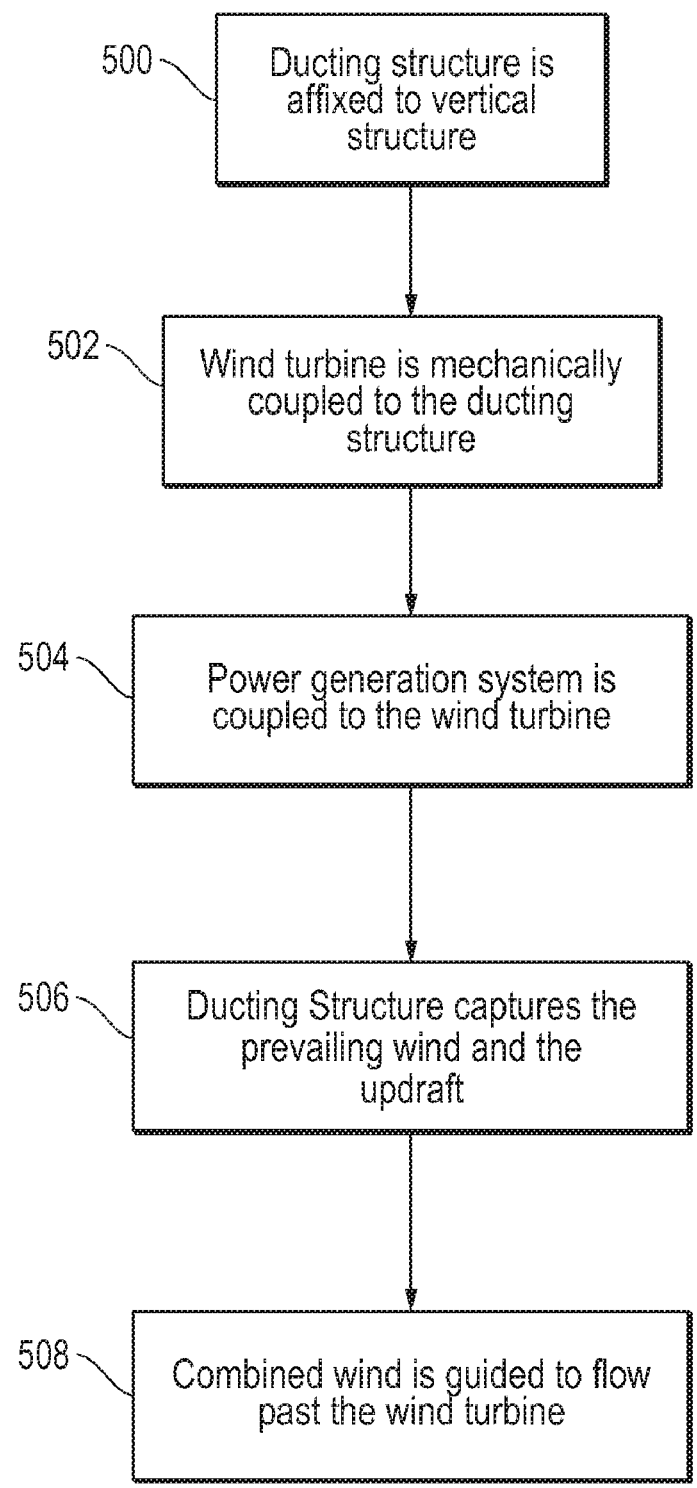
FIG. 6 is a flow chart illustrating the steps of generating wind power from a vertical structure according to the teachings of the present invention.

FIG. 6 is a flow chart illustrating the steps of a method of generating wind power from a vertical structure according to the teachings of the present invention. With reference to FIGS. 2-6, the method will now be explained. In step 500, the ducting structure 288 is positioned and affixed on an edge of a vertical structure, such as the building at the roofline. Preferably, the base panel 388 is affixed at the edge (e.g., roofline) and does not extend beyond the roofline of the building. However, the horizontally oriented aperture 233 extends outward from the building at a distance of X to capture the updraft 255 as it travels upwardly upon the face of the building. The ducting structure may be affixed to the building in any fashion which securely attaches the ducting structure to the building and prevents inadvertent detachment from the building, especially in strong wind conditions. The present invention may use anchors, cables or other devices which attach to the ducting structure and the building to provide a stable platform. Next, in step 502, the wind turbine 288 is mechanically coupled to the ducting structure 211. In step 504, a power generation system for transferring the kinetic energy of the moving wind turbine is coupled to the wind turbine (not shown). The power generation system, due to its proximity to the building, may provide power directly to the building or nearby locations, thereby reducing transmission losses. In step 506, the ducting structure 211 captures a portion of the prevailing wind 244 and the updraft 255, which is combined into the combined wind 266? The prevailing wind 244 flows and hits the building at different altitudes. The prevailing wind 244, at higher altitudes (such as at the roofline of the building), typically has a higher velocity. The vertically oriented aperture 222 captures the prevailing wind and directs the captured prevailing wind toward the wind turbine 288. Additionally, the prevailing wind 244 hits the building and flows upwardly to create an updraft 255. The horizontally oriented aperture 233 captures this updraft and directs the updraft towards the wind turbine 288. The combined updraft 255 and prevailing wind 244 creates the combined wind 266, which is directed toward the wind turbine 288. Next, in step 508, the combined wind is guided to flow past the wind turbine 288. The wind turbine rotates as the combined wind 266 flows by the wind turbine 288 and out through the exhaust aperture 299. As the wind turbine 288 rotates, the kinetic energy created from the rotation of the wind turbine generates power as is well known in existing wind generation systems.

The present invention may be utilized with any type of wind turbine. In addition, although a vertically oriented wind turbine is depicted, the present invention may be used with a horizontally oriented wind turbine. Additionally, any type of shape and size of ducting may be utilized which captures both the updraft and the prevailing wind and still remain in the scope of the present invention. Additionally, the present invention may be utilized in any fluid medium, such as water. In another embodiment, the ducting structure may include only the horizontally oriented aperture having only one duct to capture the updraft.

The present invention provides many advantages over existing wind generation devices. The present invention provides an efficient and economic way of generating power by capturing both the prevailing wind and the updraft at a building edge. In addition, the present invention enables the capture of wind for generation of power in urban areas without utilizing separate towers solely dedicated to housing the wind turbines. Furthermore, the present invention provides a wind generation source located near areas which will need the generated power, thereby reducing transmission losses associated with lengthy transmission lines.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A ducting structure for generating power from fluid flow by a vertical structure, the ducting structure comprising:
   a main housing sized and shaped to be coupled to a turbine and located on the vertical structure; and
   a horizontally oriented aperture within the main housing having a first duct leading to the coupled turbine;
   wherein the horizontally oriented aperture captures an updraft flowing upwardly along the vertical structure;
   whereby the captured updraft is guided through the first duct past the coupled turbine.

2. The ducting structure according to claim 1 further comprising:
   a vertically oriented aperture within the main housing having a second duct leading to the coupled turbine;
   wherein the vertically oriented aperture captures a prevailing fluid flow;
   whereby the captured updraft and prevailing fluid flow are guided past the coupled turbine.

3. The ducting structure according to claim 2 wherein:
   the fluid flow is a wind flowing past the vertical structure;
   the prevailing fluid flow is a prevailing wind; and
   the turbine is a wind turbine.

4. The ducting structure according to claim 2 further comprising a separation wall separating a portion of the first and second ducts.

5. The ducting structure according to claim 4 wherein the separation wall is curved.

6. The ducting structure according to claim 4 wherein the first and second ducts meet adjacent to the turbine.

7. The ducting structure according to claim 2 wherein the vertical structure is a building having a roofline edge and the horizontally oriented aperture is positioned to extend outward from the roofline edge of the building.

8. The ducting structure according to claim 1 further comprising a side panel affixed to a side of the main house adjacent the horizontally oriented aperture.

9. A wind power generation apparatus for generating wind power from a vertical structure, the apparatus comprising:
   a wind turbine;
   a main housing sized and shaped to be coupled to the wind turbine and located on the vertical structure;
   a vertically oriented aperture within the main housing having a first duct leading to the coupled wind turbine; and
   a horizontally oriented aperture within the main housing having a second duct leading to the coupled wind turbine;
   wherein the vertically oriented aperture captures a prevailing wind;
   wherein the horizontally oriented aperture captures an updraft flowing upwardly along the vertical structure;
   whereby the captured updraft and the prevailing wind are guided through the first and second ducts past the coupled wind turbine for generating wind power.

10. The apparatus according to claim 9 further comprising a separation wall separating a portion of the first and second ducts.

11. The apparatus according to claim 10 wherein the separation wall is curved.

12. The apparatus according to claim 10 wherein the first and second ducts meet adjacent to the wind turbine.

13. The apparatus according to claim 9 wherein the vertical structure is a building having a roofline edge.

14. The apparatus according to claim 13 wherein the horizontally oriented aperture is positioned to extend outward from the roofline edge of the building.

15. The apparatus according to claim 9 further comprising a side panel affixed to a side of the main house adjacent the horizontally oriented aperture.

16. A method of generating wind power from a vertical structure, the method comprising the steps of:
- affixing a ducting structure on an edge of the vertical structure;
- coupling a wind turbine to the ducting structure;
- coupling a power generation system to the wind turbine;
- capturing and guiding a portion of a prevailing wind by a vertically oriented aperture through a first duct toward the wind turbine;
- capturing and guiding a portion of an updraft traveling upward along the vertical structure by a horizontally oriented aperture through a second duct toward the wind turbine;
- guiding the captured prevailing wind and updraft past the wind turbine, thereby rotating the wind turbine; and
- generating electric power by the power generation system, the power generation system converting kinetic energy from rotation of the wind turbine to electric power.

17. The method according to claim 16 wherein the vertical structure is a building having a roofline edge, wherein the horizontally oriented aperture is positioned to extend outward from the roofline edge of the building.

18. A wind power generation system for generating wind power from a vertical structure, the system comprising:
- a plurality of wind generation devices aligned adjacent each other along a top edge of the vertical structure;
- each wind generation device comprising:
  - a wind turbine;
  - a main housing sized and shaped to be coupled to the wind turbine and located on the vertical structure;
  - a vertically oriented aperture within the main housing having a first duct leading to the coupled wind turbine; and
  - a horizontally oriented aperture within the main housing having a second duct leading to the coupled wind turbine;
  - wherein the vertically oriented aperture captures a prevailing wind;
  - wherein the horizontally oriented aperture captures an updraft flowing upwardly along the vertical structure;
- whereby the captured updraft and the prevailing wind are guided through the first and second ducts past the coupled wind turbine for generating wind power.

19. The wind power generation system according to claim 18 wherein an end wind generation device of the plurality of wind generation devices includes a side panel affixed to a side of the main house adjacent the horizontally oriented aperture.

* * * * *